United States Patent
Changiz Rezaei et al.

(10) Patent No.: US 10,268,964 B2
(45) Date of Patent: Apr. 23, 2019

(54) METHOD AND SYSTEM FOR SOLVING A MINIMUM CONNECTED DOMINATING SET PROBLEM USING QUANTUM ANNEALING FOR DISTANCE OPTIMIZATION

(71) Applicant: 1QB INFORMATION TECHNOLOGIES INC., Vancouver (CA)

(72) Inventors: Seyed Saeed Changiz Rezaei, Vancouver (CA); Brad Woods, Vancouver (CA); Pooya Ronagh, Vancouver (CA)

(73) Assignee: 1QB INFORMATION TECHNOLOGIES INC., Vancouver, British Columbia (CA)

( * ) Notice: Subject to any disclaimer, the term of this patent is extended or adjusted under 35 U.S.C. 154(b) by 472 days.

(21) Appl. No.: 15/085,651

(22) Filed: Mar. 30, 2016

(65) Prior Publication Data
US 2017/0286852 A1    Oct. 5, 2017

(51) Int. Cl.
  *G06N 5/04*    (2006.01)
  *G06N 99/00*   (2019.01)
  *H04L 29/08*   (2006.01)
(52) U.S. Cl.
  CPC .......... *G06N 5/048* (2013.01); *G06N 99/005* (2013.01); *H04L 67/306* (2013.01)
(58) Field of Classification Search
  CPC ..... G06N 5/048; G06N 99/005; H04L 67/306
  USPC .......................................... 706/52
  See application file for complete search history.

(56) References Cited

U.S. PATENT DOCUMENTS

| 8,126,649 B2 * | 2/2012 | Frasch ............... G06F 19/24 435/6.11 |
| 8,655,828 B2 | 2/2014 | Rose |
| 2006/0225165 A1 | 10/2006 | Maassen van den Brink et al. |

(Continued)

FOREIGN PATENT DOCUMENTS

CA    2881033    4/2015

OTHER PUBLICATIONS

Farhi et al., "Quantum Adiabatic Evolution Algorithms versus Simulated Annealing," arXiv.org:quant-ph/0201031v1 (2002), pp. 1-16.

(Continued)

*Primary Examiner* — Harry W Byrne
(74) *Attorney, Agent, or Firm* — Pearl Cohen Zedek Latzer Baratz LLP

(57) ABSTRACT

A method is disclosed for determining a minimum connected dominating set in a graph, the method comprising obtaining an indication of an input graph, the input graph comprising a plurality of nodes and a plurality of edges; generating a distance table comprising for each node of the input graph, an indication of a distance between the given node and each of the other node of the plurality of nodes; generating a corresponding constrained binary quadratic programming problem using the generated distance table; providing the corresponding constrained binary quadratic programming problem to a quantum annealing solver; obtaining at least one approximate solution from the quantum annealing solver; post-processing the at least one approximate solution and providing the post-processed at least one approximate solution.

6 Claims, 12 Drawing Sheets

(56) References Cited

U.S. PATENT DOCUMENTS

2008/0218519 A1 9/2008 Coury et al.
2009/0047677 A1* 2/2009 Frasch .................. G06F 19/24
435/6.18

OTHER PUBLICATIONS

McGeoch et al., (2013), "Experimental Evaluation of an Adiabatic Quantum System for Combinatorial Optimization," Computing Frontiers, May 14-16, 2013 (http://www.cs.amherst.edu/ccm/cf14-mcgeoch.pdf).
Cai et al. "A practical heuristic for finding graph minors," arXiv:1406.2741v1 (2014) pp. 1-16.
The D-Wave Quantum Computer, Brochure, D-Wave Systems, Inc., 2016, 09-1063A-B.
Johnson, Donald B., "Efficient Algorithms for Shortest Paths in Sparse Networks", Journal of the ACM, vol. 24 (1):1977, pp. 1-13, doi:10.1145/321992.321993.
Programming with QUBOs, Technical report, D-Wave Systems, Inc., 2015, Release 2.1, 09-1002A-B.
Developer Guide for Python, Programming guide, D-Wave Systems, Inc., 2016, Release 2.3, 09-1024A-A.
Min et al., "Improving Construction for Connected Dominating Set with Steiner Tree in Wireless Sensor Networks," Journal of Global Optimization, vol. 35, No. 1, (2006) pp. 111-119 (http://dx.doi.org/10.1007/s10898-005-8466-1).
"The D-Wave 2X Quantum Computer Technology Overview." D-Wave Systems Inc. 2015. www.dwavesys.com.
Dinneen, MJ et al.: "Formulating Graph Covering Problems for Adiabatic Quantum Computers", Proceedings of the Australasian Computer Science Week Multiconference, ACSW '17, Article No. 18, pp. 1-10, Jan. 31-Feb. 3, 2017, Geelong, Australia.
Kuosmanen, P.: "Other Routing Protocols for Ad Hoc Networks", Mar. 2002, pp. 1-13.
International Search Report for PCT Application No. PCT/IB2017/055916, dated Jun. 5, 2018.

* cited by examiner

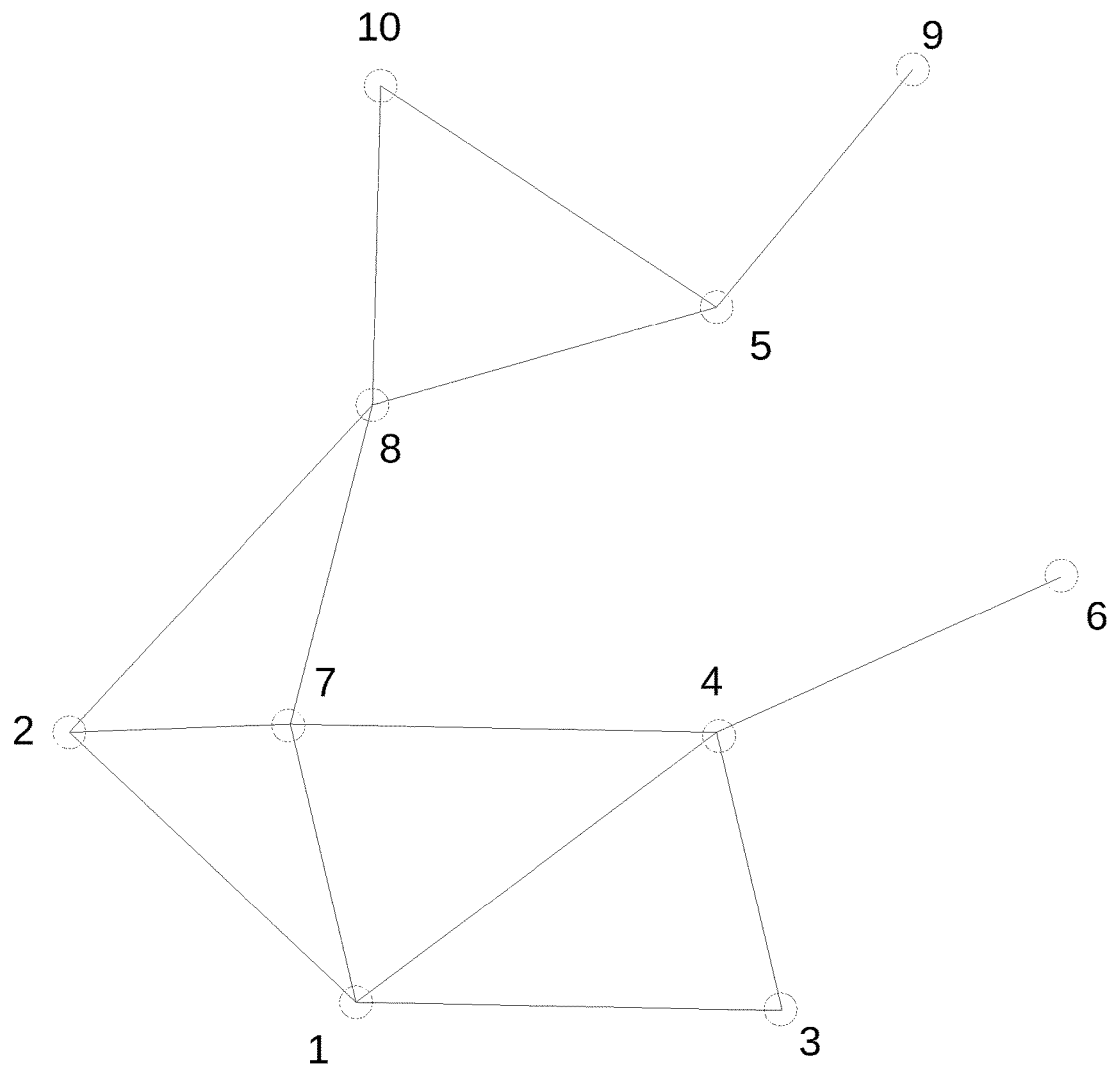
Fig. 7a-i $$A = \begin{bmatrix} 0 & 1 & 1 & 1 & 0 & 0 & 1 & 0 & 0 & 0 \\ 1 & 0 & 0 & 0 & 0 & 0 & 1 & 1 & 0 & 0 \\ 1 & 0 & 0 & 1 & 0 & 0 & 0 & 0 & 0 & 0 \\ 1 & 0 & 1 & 0 & 0 & 1 & 1 & 0 & 0 & 0 \\ 0 & 0 & 0 & 0 & 0 & 0 & 0 & 1 & 1 & 1 \\ 0 & 0 & 0 & 1 & 0 & 0 & 0 & 0 & 0 & 0 \\ 1 & 1 & 0 & 1 & 0 & 0 & 0 & 1 & 0 & 0 \\ 0 & 1 & 0 & 0 & 1 & 0 & 1 & 0 & 0 & 1 \\ 0 & 0 & 0 & 0 & 1 & 0 & 0 & 0 & 0 & 0 \\ 0 & 0 & 0 & 0 & 1 & 0 & 0 & 1 & 0 & 0 \end{bmatrix}$$

Fig. 7a-ii $$D = \begin{bmatrix} 0 & 1 & 1 & 1 & 3 & 2 & 1 & 2 & 4 & 3 \\ 1 & 0 & 2 & 2 & 2 & 3 & 1 & 1 & 3 & 2 \\ 1 & 2 & 0 & 1 & 4 & 2 & 2 & 3 & 5 & 4 \\ 1 & 2 & 1 & 0 & 3 & 1 & 1 & 2 & 4 & 3 \\ 3 & 2 & 4 & 3 & 0 & 4 & 2 & 1 & 1 & 1 \\ 2 & 3 & 2 & 1 & 4 & 0 & 2 & 3 & 5 & 4 \\ 1 & 1 & 2 & 1 & 2 & 2 & 0 & 1 & 3 & 2 \\ 2 & 1 & 3 & 2 & 1 & 3 & 1 & 0 & 2 & 1 \\ 4 & 3 & 5 & 4 & 1 & 5 & 3 & 2 & 0 & 2 \\ 3 & 2 & 4 & 3 & 1 & 4 & 2 & 1 & 2 & 0 \end{bmatrix}$$

Fig. 7b $$\min x^T D x$$
$$(A + I)x \geq 1,$$
$$x \in \{0, 1\}^n.$$

Fig. 7c

METHOD AND SYSTEM FOR SOLVING A MINIMUM CONNECTED DOMINATING SET PROBLEM USING QUANTUM ANNEALING FOR DISTANCE OPTIMIZATION

FIELD OF THE INVENTION

This invention relates to computing. More precisely, this invention pertains to a method and system for solving a minimum connected dominating set problem using quantum annealing for distance optimization.

BACKGROUND OF THE INVENTION

Most interesting combinatorial optimization problems are hard to solve. To name a few, the maximum common subgraph, graph partitioning, graph colouring, and travelling salesman problems are among those combinatorial optimization problems which have been proved to be NP-hard. Some of these problems have significant real-world applications which make them especially interesting. For example, the minimum dominating set problem is an interesting problem used in the analysis of social networks.

A social network can be interpreted as a graph of relationships and interactions between a set of people. Nodes of a social network can represent individuals and organizations, and two nodes are adjacent if there is some kind of relationship between them.

Finding the minimum number of people in a social network which are familiar to the whole set of individuals is an interesting problem. This is because we can interpret these people as being the most influential individuals in the network. Finding the most influential individuals in the network can be done by solving an instance of the minimum dominating set problem for the graph representing the social network.

An interesting example of a social network is a web graph. A web graph is defined as a directed graph whose nodes are the pages of the World Wide Web, and there is a directed edge between, say webpage X to webpage Y, if there is a hyperlink on page X referring to page Y.

A variant of the minimum dominating set problem is the minimum connected dominating set problem. Aside from its application in the study of social networks, this problem can be used in designing mobile ad-hoc networks.

A mobile ad-hoc network is a self-configuring wireless network of mobile devices which are connected without wires and over an infrastructure-less network, i.e., there is no central administration in the network.

Usually, each node in a wireless network is a computing device with a limited energy source such as a battery. The energy consumed for transmitting a message increases super-linearly with transmission distance.

Fortunately, extending the idea of constructing a backbone-like structure in conventional wired networks, such as the Internet, to wireless networks through the notion of a virtual backbone is quite feasible.

Exploiting a virtual backbone has important immediate benefits. By incorporating only the nodes forming the backbone in the routing procedures, the telecommunications overhead is reduced, the bandwidth efficiency is increased, and the overall energy consumption is decreased. This advantage becomes more pronounced as the size of the backbone becomes smaller. Hence, people are motivated to find the smallest-sized possible virtual backbone.

Another real-world example of an application of the minimum connected dominating set problem is in the development of optical telecommunications networks due in part to exponentially growing demands of users.

One of the main problems that these networks must overcome is the deterioration of the optical signal as the distance from the source increases. Therefore, signals must be regenerated periodically using regenerators. In practice, the network is designed so that regenerators are placed at nodes of the network in a way such that all nodes of the network can communicate without significant signal impairments.

One can see that designing a smallest-sized virtual backbone as well as finding the minimum number of regenerators in an optical telecommunications network is a matter of solving a minimum connected dominating set problem.

Features of the invention will be apparent from review of the disclosure, drawings, and description of the invention below.

BRIEF SUMMARY OF THE INVENTION

According to a broad aspect, there is disclosed a method for determining a minimum connected dominating set in a graph, the method comprising obtaining an indication of an input graph, the input graph comprising a plurality of nodes and a plurality of edges; generating a distance table comprising for each node of the input graph, an indication of a distance between the given node and each of the other node of the plurality of nodes; generating a corresponding constrained binary quadratic programming problem using the distance generated distance table; providing the corresponding constrained binary quadratic programming problem to a quantum annealing solver; obtaining at least one approximate solution from the quantum annealing solver; post-processing the at least one approximate solution and providing the post-processed at least one approximate solution.

According to one embodiment, the quantum annealing solver is an unconstrained quantum annealing solver; the providing of the corresponding constrained binary quadratic programming problem comprises generating an unconstrained binary quadratic programming problem using the generated constrained binary quadratic programming problem; and providing the generated unconstrained binary quadratic programming problem to the unconstrained quantum annealing solver; and the at least one approximate solution is obtained from the unconstrained quantum annealing solver.

According to one embodiment, the quantum annealing solver is a constrained quantum annealing solver; the providing of the corresponding constrained binary quadratic programming problem comprises obtaining a corresponding solver subroutine and solving the generated constrained binary quadratic programming problem using the solver subroutine, and the at least one approximate solution is obtained from the solver subroutine.

According to a broad aspect, there is disclosed a method for determining a minimum connected dominating set in a graph, the method comprising obtaining an indication of an input graph, the input graph comprising a plurality of nodes and a plurality of edges; obtaining an indication of a solver to use for determining a minimum connected dominating set; generating a distance table comprising for each node of the input graph, an indication of a distance between the given node and each of the other node of the plurality of nodes; generating a corresponding constrained binary quadratic programming problem using the generated distance table; if the indication of a solver comprises an unconstrained quantum annealing solver generating an unconstrained binary quadratic programming problem using the generated constrained binary quadratic programming problem, providing the unconstrained binary quadratic programming problem to the unconstrained quantum annealing solver, obtaining at least one approximate solution from the unconstrained quantum annealing solver, if the indication of a solver comprises a constrained quantum annealing solver obtaining a corresponding solver subroutine, solving the generated constrained binary quadratic programming problem using the solver subroutine, and obtaining at least one approximate solution from the solver subroutine, post-processing the at least one approximate solution and providing the post-processed at least one approximate solution.

In accordance with an embodiment, the indication of an input graph is obtained from at least one of a user interacting with a digital computer, a computer operatively connected to the digital computer, a software package, and an intelligent agent.

In accordance with an embodiment, the post-processed at least one approximate solution is provided to at least one of a user interacting with a digital computer, a computer operatively connected to the digital computer, a software package, and an intelligent agent.

According to a broad aspect, there is disclosed a non-transitory computer-readable storage medium for storing computer-executable instructions which, when executed, cause a digital computer to perform a method for determining a minimum connected dominating set in a graph, the method comprising obtaining an indication of an input graph, the input graph comprising a plurality of nodes and a plurality of edges; generating a distance table comprising for each node of the input graph, an indication of a distance between the given node and each of the other node of the plurality of nodes; generating a corresponding constrained binary quadratic programming problem using the generated distance table; providing the corresponding constrained binary quadratic programming problem to a quantum annealing solver; obtaining at least one approximate solution from the quantum annealing solver; post-processing the at least one approximate solution and providing the post-processed at least one approximate solution.

In accordance with a broad aspect, there is disclosed a digital computer comprising a central processing unit; a display device; a communication port for operatively connecting the digital computer to a quantum annealing solver; a memory unit comprising an application for determining a minimum connected dominating set in a graph, the application comprising instructions for obtaining an indication of an input graph, the input graph comprising a plurality of nodes and a plurality of edges; instructions for generating a distance table comprising for each node of the input graph, an indication of a distance between the given node and each of the other node of the plurality of nodes; instructions for generating a corresponding constrained binary quadratic programming problem using the generated distance table; instructions for providing the corresponding constrained binary quadratic programming problem to a quantum annealing solver; instructions for obtaining at least one approximate solution from the quantum annealing solver; instructions for post-processing the at least one approximate solution and instructions for providing the post-processed at least one approximate solution and a data bus for interconnecting the central processing unit, the display device, the communication port, and the memory unit.

In accordance with a broad aspect, there is disclosed a method for determining a minimum connected dominating set in a graph, the method comprising use of a processing unit for obtaining an indication of an input graph, the input graph comprising a plurality of nodes and a plurality of edges; use of a processing unit generating a distance table comprising for each node of the input graph, an indication of a distance between the given node and each of the other node of the plurality of nodes; use of a processing unit generating a corresponding constrained binary quadratic programming problem using the generated distance table; use of a processing unit providing the corresponding constrained binary quadratic programming problem to a quantum annealing solver; use of a processing unit obtaining at least one approximate solution from the quantum annealing solver; use of a processing unit post-processing the at least one approximate solution; and use of a processing unit providing the post-processed at least one approximate solution An advantage of the method disclosed is that it provides a near-optimal solution to a minimum connected dominating set problem for many problem instances in less time compared to prior art methods.

Another advantage is that the processing of a system for determining a minimum connected dominating set problem is greatly improved. As a matter of fact, the solving of the minimum connected dominating set problem in a graph in an exact optimum way is a hard problem with a non-obvious solution because an exponential number of constraints, along with dominating conditions, are involved.

BRIEF DESCRIPTION OF THE DRAWINGS

In order that the invention may be readily understood, embodiments of the invention are illustrated by way of example in the accompanying drawings.

FIG. 7a-i is a diagram which shows an embodiment of a graph for which a minimum connected dominating set may be determined.

FIG. 7a-ii is a diagram which shows an embodiment of the adjacency matrix of the graph shown in FIG. 7a-i.

FIG. 7b shows an embodiment of a distance matrix illustrating, for each node of the graph disclosed in FIG. 7a-i, a distance between the given node and the other nodes of the graph.

FIG. 7c shows an embodiment of a corresponding constrained binary quadratic problem generated using the adjacency matrix disclosed in FIG. 7a-ii and the distance matrix disclosed in FIG. 7b.

FIG. 7d shows at least one approximate solution generated by a quantum annealing solver.

FIG. 7e is a diagram which illustrates the result of a post-processing performed on the at least one approximate solution generated by the quantum annealing solver.

Figure 1:
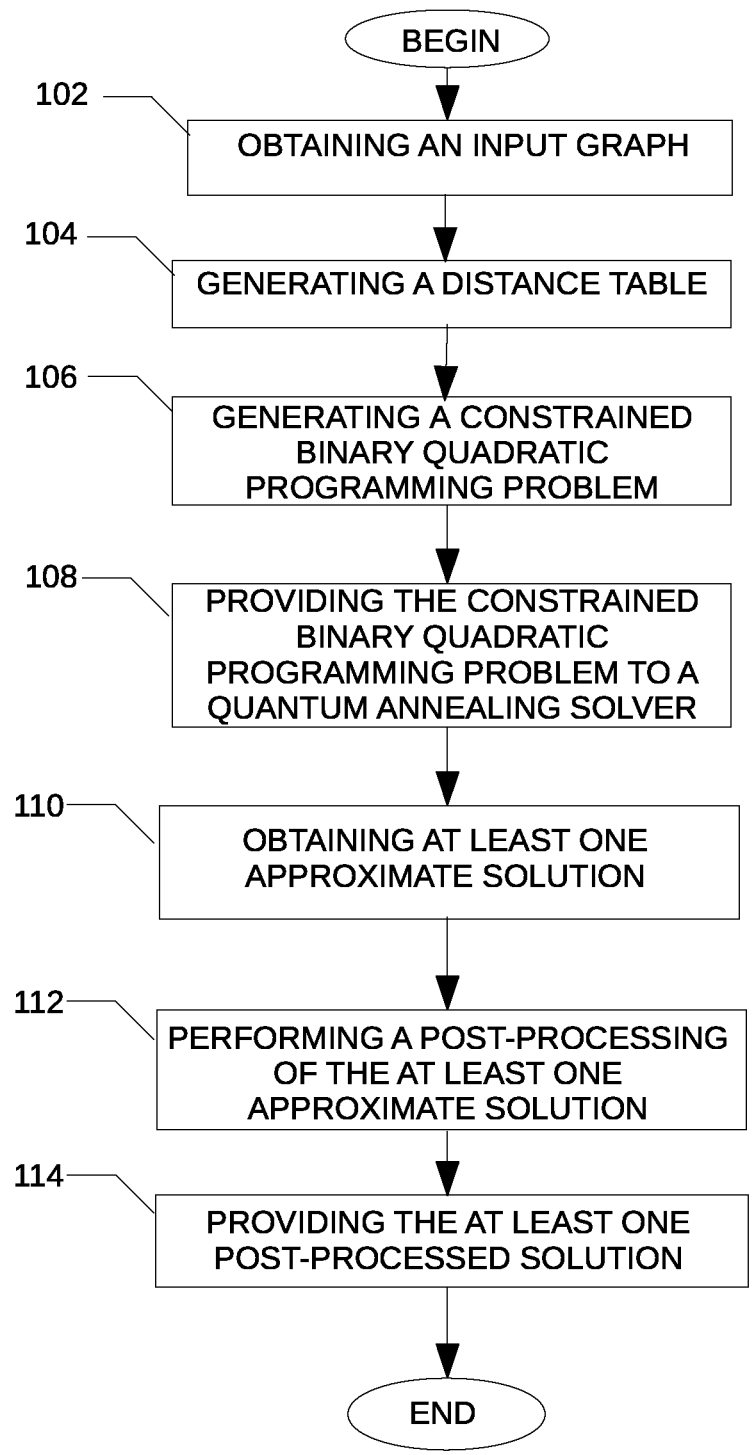
FIG. 1 is a flowchart which shows an embodiment of a method for determining a minimum connected dominating set in a graph.

Further details of the invention and its advantages will be apparent from the detailed description included below.

DETAILED DESCRIPTION OF THE INVENTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment," and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising," and variations thereof mean "including but not limited to," unless expressly specified otherwise.

The terms "a," "an," and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective, or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "i.e." and like terms mean "that is," and thus limit the terms or phrases they explain.

The term "quantum annealer," "quantum annealing solver," and like terms mean a system consisting of one or many types of hardware that can find optimal or sub-optimal solutions to an unconstrained binary quadratic programming problem. An example of this is a system consisting of a digital computer embedding a binary quadratic programming problem as an Ising spin model, attached to an analogue computer that carries optimization of a configuration of spins in an Ising spin model using quantum annealing as described, for example, in Farhi, E. et al., "Quantum Adiabatic Evolution Algorithms versus Simulated Annealing," arXiv.org:quant-ph/0201031 (2002), pp. 1-16. An embodiment of such analogue computer is disclosed by McGeoch, Catherine C., and Cong Wang, (2013), "Experimental Evaluation of an Adiabatic Quantum System for Combinatorial Optimization," Computing Frontiers, May 14-16,2013 (http://www.cs.amherst.edu/ccm/cf14-mcgeoch.pdf) and also disclosed in U.S. Patent Application Publication No. US2006/0225165. It will be appreciated that the "quantum annealer" may also comprise "classical components," such as a classical computer. Accordingly, a "quantum annealer" may be entirely analogue or an analogue-classical hybrid.

The term "embedding" of a binary optimization problem, and the like, refer to an assignment of a set of the quantum bits $\{q_{i1}, q_{i2}, \ldots q_{il_i}\}$ to each binary variable $x_i$. Specifications of the role of such an embedding in solving an unconstrained binary quadratic programming problem and presentation of an efficient algorithm for it are disclosed for instance in "*A practical heuristic for finding graph minors*"—Jun Cai, William G. Macready, Aidan Roy, in U.S. Patent Application Publication No. US2008/0218519 and in U.S. Pat. No. 8,655,828 B2.

The term "graph" and like terms mean an ordered pair G=(V, E) comprising a set V of nodes and a set E of edges.

In one embodiment, graph G is a graph representing an optical telecommunications network. The nodes of G are users and hubs, and the edges of G are the fibre-optic cables connecting them.

The term "connected subgraph" and like terms mean a subset of nodes in the graph G such that every node in the subgraph is reachable from every other node in the subgraph through a sequence of incident edges.

In one embodiment, a subgraph of an optical telecommunications network is connected if there is a sequence of fibre-optic cables connecting all pairs of nodes in that subgraph.

The term "dominating set" and like terms mean that for a subset of nodes in graph G, every node not in the subset is adjacent to at least one node in the subset.

In one embodiment, a set of regenerators in an optical telecommunications network is a dominating set.

The term "minimum dominating set" and like terms mean a dominating set of minimum size.

In one embodiment, a set of regenerators in an optical telecommunications network is a dominating set of minimum size.

The term "minimum connected dominating set" and like terms mean a minimum dominating set which is a connected subgraph of an original graph.

In one embodiment, a set of signal regenerators in an optical telecommunications network is a connected dominating set of minimum size.

The term "result" and like terms mean an optimal or suboptimal solution to the following integer programming problem.

Let $x \in \{0,1\}^n$ where n denotes the number of nodes of the input graph G. Then $x_i$ is 1 if node i is in the dominating set and 0 otherwise. Furthermore, let N(i) denote the set of nodes of G which are adjacent to node i. It will be appreciated that the minimum connected dominating set is the solution to:

min $\Sigma_{i \in V} x_i$
$\Sigma_{j \in N(i)} x_j \geq 1$, for all nodes $i \in V$,
G[x] is connected,
$x_i \in \{0, 1\}$, where G[x] denotes the induced subgraph represented by x.

The term "path" and like terms mean a sequence of distinct adjacent nodes in graph G. The length of a path is the number of edges in the sequence. The term "shortest path" and like terms mean a path between two nodes with the minimum number of edges. In one embodiment, a shortest path in an optical telecommunications network is a shortest sequence of fibre-optic cables.

The term "distance matrix" and like terms mean an n by n matrix D of a graph G, where n is the number of nodes of G, and where $D_{ij}$ is the length of a shortest path between nodes i and j. $D_{ij}$ is the distance between nodes i and j.

In one embodiment, the distance matrix of an optical telecommunications network contains the shortest distances between pairs of nodes.

Neither the Title nor the Abstract is to be taken as limiting in any way the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

It will be appreciated that the invention may be implemented in numerous ways, including as a method, a system, a computer readable medium such as a computer-readable storage medium. In this specification, these implementations, or any other form that the invention may take, may be referred to as systems or techniques. A component such as a processor or memory described as being configured to perform a task includes both a general component that is temporarily configured to perform the task at a given time and/or a specific component that is manufactured to perform the task.

With all of this in mind, the present application is directed to a method and system for determining a minimum connected dominating set problem in a graph.

As mentioned previously, it will be appreciated that the method may be used in various applications, such as, for instance, building and analyzing telecommunication networks. More precisely, one can see that designing a smallest-sized virtual backbone as well as finding the minimum number of regenerators in an optical telecommunications network is a matter of solving a minimum connected dominating set problem.

Figure 5:
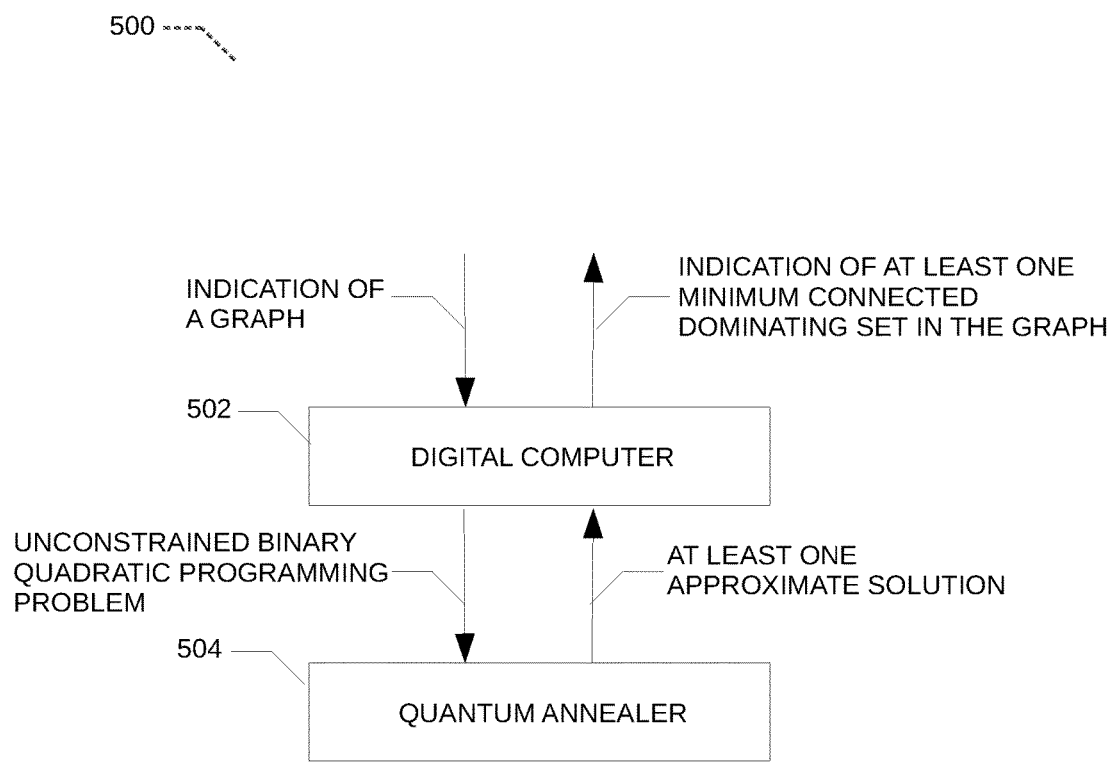
FIG. 5 is a block diagram which shows an embodiment of a system for determining a minimum connected dominating set in a graph; the system comprises a digital computer and a quantum annealing solver.

Now referring to FIG. 5, there is shown an embodiment of a system 500 in which an embodiment of the method for determining a minimum connected dominating set problem in a graph may be implemented.

The system 500 comprises a digital computer 502 and a quantum annealer 504.

The digital computer 502 receives an indication of a graph for which a minimum connected dominating set has to be determined and provides an indication of at least one minimum connected dominating set in the graph.

It will be appreciated that the indication of the graph for which at least one minimum connected dominating set problem has to be determined may be provided according to various embodiments.

In one embodiment, the indication of a graph for which at least one minimum connected dominating set problem has to be determined is provided by a user interacting with the digital computer 502.

Alternatively, the indication of a graph for which at least one minimum connected dominating set problem has to be determined is provided by another computer, not shown, operatively connected to the digital computer 502.

Alternatively, the indication of a graph for which at least one minimum connected dominating set problem has to be determined is provided by an independent software package.

Alternatively, the indication of a graph for which at least one minimum connected dominating set problem has to be determined is provided by an intelligent agent.

Similarly, it will be appreciated that the indication of at least one minimum connected dominating set in the graph may be provided according to various embodiments.

In accordance with an embodiment, the indication of at least one minimum connected dominating set in the graph is provided to the user interacting with the digital computer 502.

Alternatively, the indication of at least one minimum connected dominating set in the graph solution is provided to another computer operatively connected to the digital computer 502.

In fact, it will be appreciated by the skilled addressee that the digital computer 502 may be any type of computer.

In one embodiment, the digital computer 502 is selected from a group consisting of desktop computers, laptop computers, tablet PCs, servers, smartphones, etc.

Now referring back to FIG. 5, it will be appreciated that the quantum annealer 504 is operatively connected to the digital computer 502.

It will be appreciated that the coupling of the quantum annealer 504 to the digital computer 502 may be achieved according to various embodiments.

In one embodiment, the coupling of the quantum annealer 504 to the digital computer 502 is achieved via a data network.

It will be appreciated that the quantum annealer 504 may be of various types.

In one embodiment, the quantum annealer 504 is manufactured by D-Wave Systems Inc. More information on this embodiment of a quantum annealer applicable to 504 can be found at http://www.dwavesys.com. The skilled addressee will appreciate that various alternative embodiments may be provided for the quantum annealer 504.

More precisely, the quantum annealer 504 receives an unconstrained binary quadratic programming problem from the digital computer 502.

The quantum annealer 504 is capable of solving the unconstrained binary quadratic programming problems and of providing at least one corresponding approximate solution. In the case where a plurality of corresponding approximate solutions is provided, the plurality of corresponding approximate solutions may comprise optimal and suboptimal solutions.

The at least one corresponding approximate solution is provided by the quantum annealer 504 to the digital computer 502.

Now referring to FIG. 1, there is shown an embodiment of a method for determining a minimum connected dominating set in a graph.

According to processing step 102, an input graph is obtained.

It will be appreciated that the input graph may be obtained according to various embodiments.

It will be appreciated that the input graph comprises a plurality of nodes and a plurality of edges.

Figure 7C:
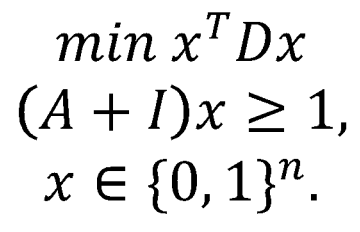
Figure 7D:
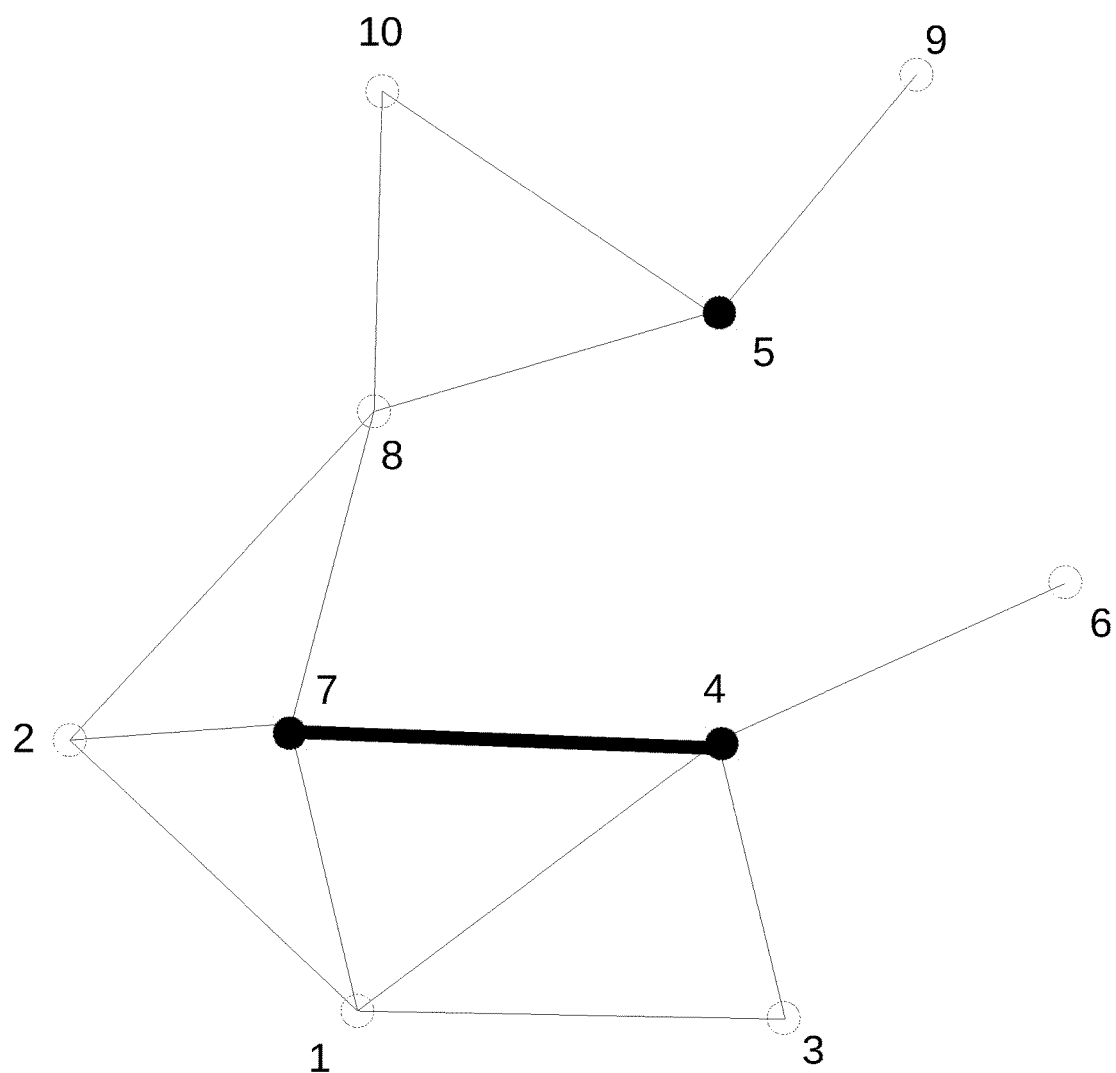

Now referring to FIG. 7*a-i*, there is shown an embodiment of an input graph comprises a plurality of nodes and a plurality of edges. An embodiment of an adjacency matrix corresponding to the input graph is shown in FIG. 7*a-ii*.

In one embodiment, in indication of the input graph is obtained from a user interacting with the digital computer 502.

Alternatively, the indication of the input graph is obtained from another computer operatively connected to the digital computer 502.

In another alternative embodiment, the indication of the input graph is obtained from an independent software package.

In a further alternative embodiment, the indication of the input graph input graph is obtained from an intelligent agent.

It will be appreciated that, in an alternative embodiment, an indication of a quantum annealing solver to use for determining a minimum connected dominating set in a graph may further be optionally provided together with the indication of the input graph.

It will be appreciated, as further explained below, that the quantum annealing solver to use may be an unconstrained quantum annealing solver in a first embodiment while it may be a constrained quantum annealing solver in another embodiment.

It will also be appreciated that the solver type may be of another different type from the unconstrained quantum annealing solver or the constrained quantum annealing solver. For instance, another classical simulated annealing-based solver may also be used to solve this problem.

Still referring to FIG. 1 and according to processing step 104, a distance table is generated.

More precisely, the distance table comprises for each node of the input graph an indication of a distance between the given node and each of the other nodes of the plurality of nodes.

In one embodiment, the distance table is a distance matrix.

Now referring to FIG. 7*b*, there is shown an embodiment of a distance matrix for the input graph shown in FIG. 7*a-i* and corresponding adjacency matrix A shown in FIG. 7*a-ii*.

More precisely the generating of the distance table comprises computing the shortest paths between every pair of nodes and subsequently generating the distance table D accordingly.

It will be appreciated that the shortest paths between every pair of nodes may computed according to various embodiments.

In one embodiment, Johnson's Algorithm is used to find all-pair shortest paths (Johnson, Donald B. (1977), "Efficient algorithms for shortest paths in sparse networks", *Journal of the ACM*, 24 (1): 1-13, doi:10.1145/321992.321993).

The skilled addressee will appreciate that various alternative embodiments may be possible.

Still referring to FIG. 1 and according to processing step 106, a constrained binary quadratic programming problem is generated.

It will be appreciated that the constrained binary quadratic programming problem is generated using the distance matrix D generated according to processing step 104. For the input graph shown in FIG. 7*a-l* with adjacency matrix A shown in FIG. 7*a-ii*, the constrained binary quadratic programming problem is formed as follows:

$$\min x^T D x$$

$$(A+I)x \geq 1,$$

$$x \in \{0,1\}^n.$$

According to processing step 108, the constrained binary quadratic programming problem is provided to a quantum annealing solver.

It will be appreciated that the constrained binary quadratic programming problem may be provided to the quantum annealing solver according to various embodiments.

Figure 2:
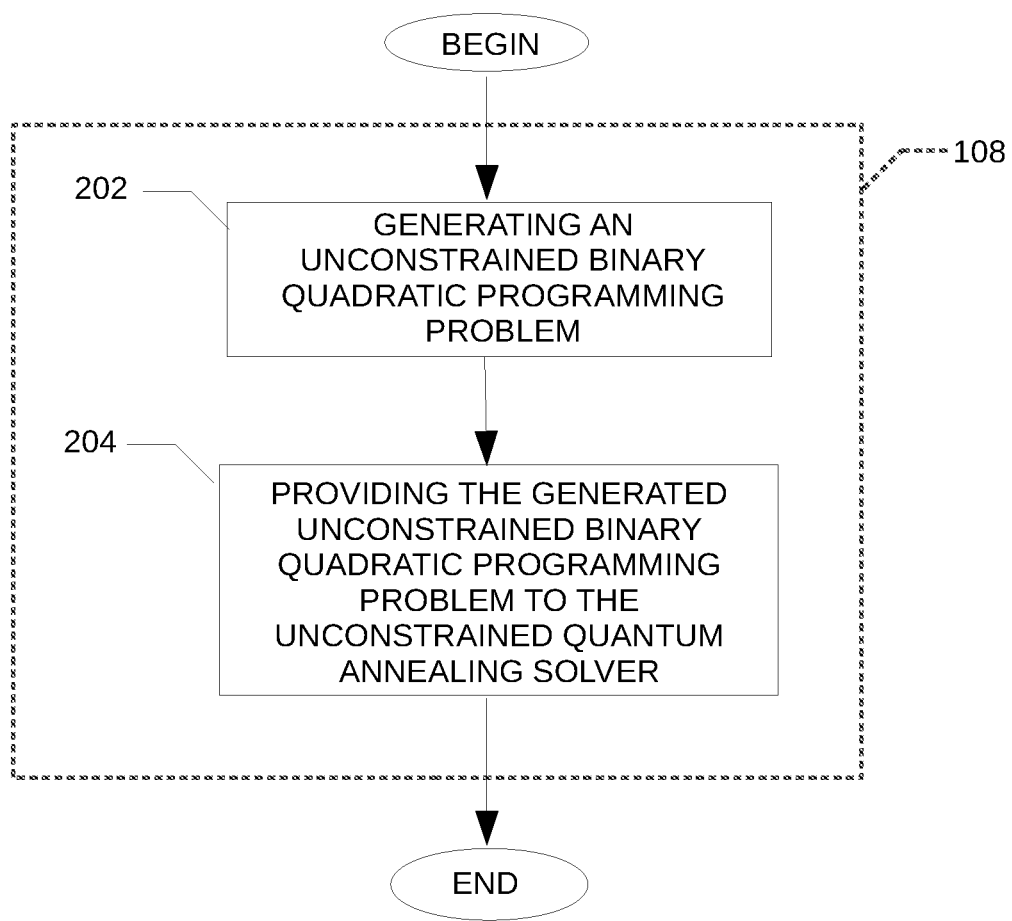
FIG. 2 is a flowchart which shows a first embodiment for providing a constrained binary quadratic programming problem to a quantum annealing solver, wherein the quantum annealing solver is an unconstrained quantum annealing solver.

Now referring to FIG. 2, there is shown a first embodiment for providing the constrained binary quadratic programming problem to the quantum annealing solver.

In this embodiment, the quantum annealing solver is an unconstrained quantum annealing solver.

According to processing step 202, an unconstrained binary quadratic problem is generated.

In one embodiment, the constrained binary quadratic programming problem is converted into an unconstrained binary quadratic programming problem using an appropriate penalty-based method by introducing slack variables and penalty coefficients (D-Wave Systems, Inc. Programming with QUBOs. Technical report, D-Wave Systems, Inc., 2015, Release 2.1, 09-1002A-B).

The skilled addressee will appreciated that various alternative embodiments may be possible.

Now referring to FIG. 7*c*, there is shown an embodiment of an unconstrained binary quadratic problem corresponding to the distance matrix shown in FIG. 7*c*.

Still referring to FIG. 2 and according to processing step 204, the generated unconstrained binary quadratic problem is provided to the unconstrained quantum annealing solver.

It will be appreciated that the generated unconstrained binary quadratic problem is provided to the unconstrained quantum annealing solver for the purpose of solving it.

It will be appreciated that the solving of the generated unconstrained binary quadratic problem by the unconstrained quantum annealing solver may be performed according to various embodiments.

In one embodiment, having formed the unconstrained binary quadratic programming, the solve_ubqp subroutine is called and the result is provided. The following code snippet is an embodiment of how the solve_ubqp subroutine can be implemented using D-Wave SAPI 2.0 (see D-Wave Systems, Inc. Developer Guide for Python, Programming guide, D-Wave Systems, Inc., 2016, Release 2.3, 09-1024A-A).

The subroutine solve_ubqp receives an object of type ubqp representative of an unconstrained binary quadratic programming problem and returns an object of type ubqp_result representative of a vector with binary entries. It will be appreciated that all the functions and types used in this snippet are supported by SAPI 2.0 except two auxiliary functions qubo_to_ising and spin_to_binary. The former function changes an unconstrained binary quadratic programming problem of type ubqp, to an Ising spin problem of type sapi_problem by a change of variables $s=2x-1$. The second function receives an array of vectors in $\{-1, 1\}$ and returns binary vectors by applying the inverse transformation $x=\frac{1}{2}(s+1)$.

gramming solver subroutine, may be obtained according to various embodiments.

In one embodiment, the solver subroutine is obtained from a user.

In one embodiment, the input constrained binary quadratic programming solver subroutine is a branch and bound procedure using Lagrangian dual bounds generated by a

```
#include <stdio.h>
#include <stdlib.h>
#include "dwave_sapi.h"
ubqp_result* solve_ubqp(ubqp& prob) {
        sapi_globalInit( );
        sapi_Problem* A = NULL;
        sapi_Problem* emb = NULL;
        sapi_problem problem = qubo_to_ising(prob);
        sapi_Embeddings* embeddings = NULL;
        sapi_FindEmbeddingParameters finder_param = SAPI_FIND_EMBEDDING_DEFAULT_PARAMETERS;
        sapi_IsingRangeProperties* range_prop = NULL;
        sapi_EmbedProblemResult* res = NULL;
        sapi_QuantumSolverParameters params =SAPI_QUANTUM_SOLVER_DEFAULT_PARAMETERS;
        sapi_IsingResult* answer = NULL;
        int* new_solutions = NULL;
        double chain_strength= -2.0;
        char err_msg[SAPI_ERROR_MESSAGE_MAX_SIZE];
        const char* url = ". . .";
        const char* token = ". . .";
        sapi_Connection* connection = NULL;
        sapi_remoteConnection(url, token, NULL, &connection, err_msg);
        sapi_getHardwareAdjacency(solvers, &A);
        sapi_findEmbedding(&problem, A, &finder_param, &embeddings, err_msg);
        sapi_embedProblem(&problem, embeddings, A,0,0, range_prop, &res, err_msg);
        /* allocate space for new embedded problem result */
        emb = malloc(sizeof(sapi_Problem*));
        emb->len = res->problem.len + res->jc.len;
        emb->elements = (sapi_ProblemEntry*)malloc(sizeof(sapi_ProblemEntry) * emb->len);
        /* store embedded problem result in new problem */
        for(index = 0; index < res->problem.len; index++) {
                emb->elements[index].i = res->problem.elements[index].i;
                emb->elements[index].j = res->problem.elements[index].j;
                emb->elements[index].value = res->problem.elements[index].value;
        }
        for(; index < emb->len; index++) {
                emb->elements[index].i = res->jc.elements[index - res->problem.len].i;
                emb->elements[index].j = res->jc.elements[index - res->problem.len].j;
                emb->elements[index].value = chain_strength;
        }
        params.num_reads = 1000;
        sapi_solveIsing(solver, emb, (sapi_SolverParameters*)¶ms, &answer,err_msg);
        size_t num_new_solutions;
        new_solutions = malloc(answer->num_solutions * num_variables * sizeof(int*));
        sapi_unembedAnswer(answer->solutions, answer->solution_len, answer->num_solutions, embeddings,
SAPI_BROKEN_CHAINS_MINIMIZE_ENERGY, &problem, new_solutions, &num_new_solutions, err_msg);
        return spin_to_binary(new_solutions);
}
```

Now referring to FIG. 7d, there is shown an example of the at least one approximate solution, that is, nodes 4, 5, and 7, shown in black, to the constrained binary quadratic problem shown in FIG. 7c for the distance matrix shown in FIG. 7b. This solution is a disconnected solution with two connected components, nodes 4 and 7, the connection indicated using a heavy black edge.

Figure 3:
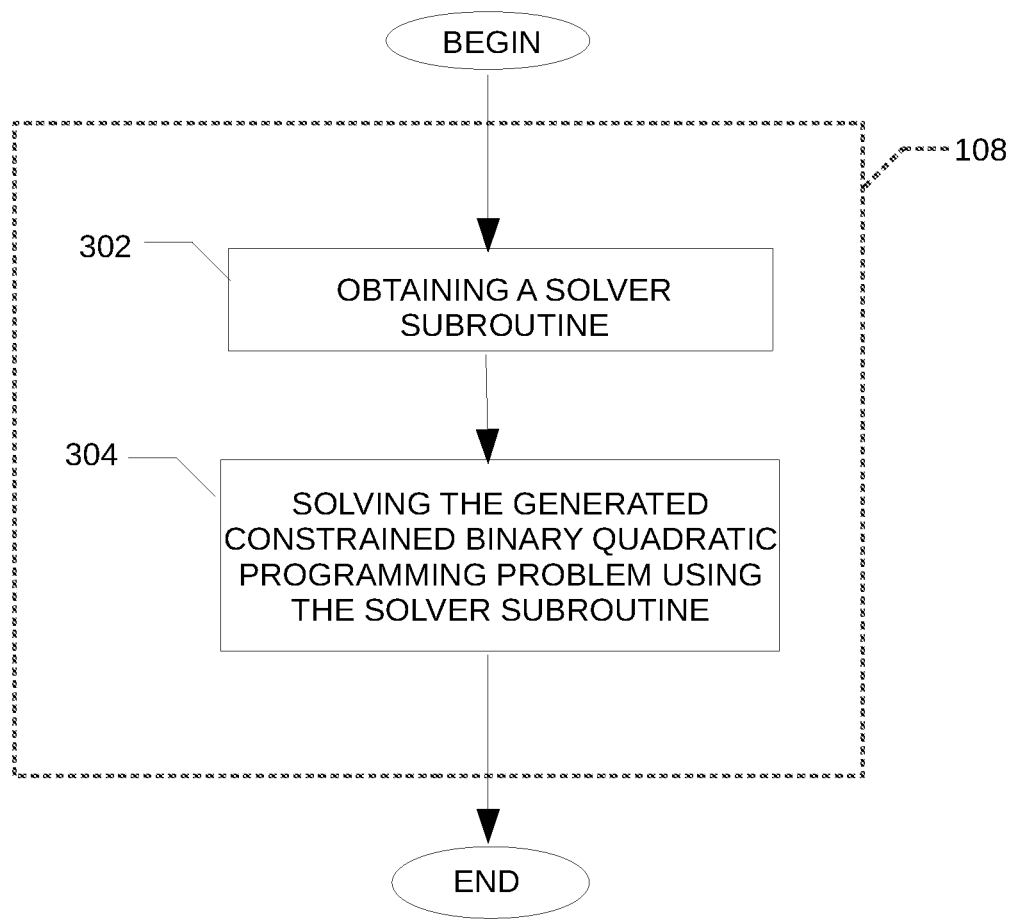
FIG. 3 is a flowchart which shows a second embodiment for providing a constrained binary quadratic programming problem to a quantum annealing solver, wherein the quantum annealing solver is a constrained quantum annealing solver.

Now referring to FIG. 3, there is shown another embodiment for providing the constrained binary quadratic programming problem to a quantum annealing solver. In this embodiment, the quantum annealing solver is an unconstrained quantum annealing solver.

According to processing step 302, a solver subroutine is obtained.

It will be appreciated that the solver subroutine, also referred to as an input constrained binary quadratic proquantum annealer (Ronagh, Pooya; Iranmanesh, Ehsan; and Woods, Brad, 2015, Canadian Patent Application No. 2,881, 033, filed Feb. 3, 2015).

In an alternative embodiment, the input constrained binary quadratic programming solver subroutine is the commercial solver IBM ILOG CPLEX Optimization Studio manufactured by IBM.

In an alternative embodiment, the input constrained binary quadratic programming solver subroutine is the commercial solver Gurobi Optimizer manufactured by Gurobi Optimization.

It will be appreciated that various alternative constrained binary quadratic programming solver subroutines may be input by the user.

It will be appreciated that the result from the execution of the solver subroutine is at least one approximate solution.

Now referring back to FIG. 1 and according to processing step 110, at least one approximate solution is obtained.

It will be appreciated that, in the embodiment where the quantum annealing solver is a constrained quantum annealing solver, the at least one approximate solution is obtained from the constrained quantum annealing solver.

It will be further appreciated that, in the embodiment where the quantum annealing solver is an unconstrained quantum annealing solver, the at least one approximate solution is obtained from the unconstrained quantum annealing solver.

It will be appreciated that the at least one approximate solution to the minimum connected dominating set problem is a minimum dominating set whose constituent nodes are as close together as possible.

According to processing step 112, a post-processing is performed on the at least one approximate solution to the minimum connected dominating set problem obtained.

Figure 4:
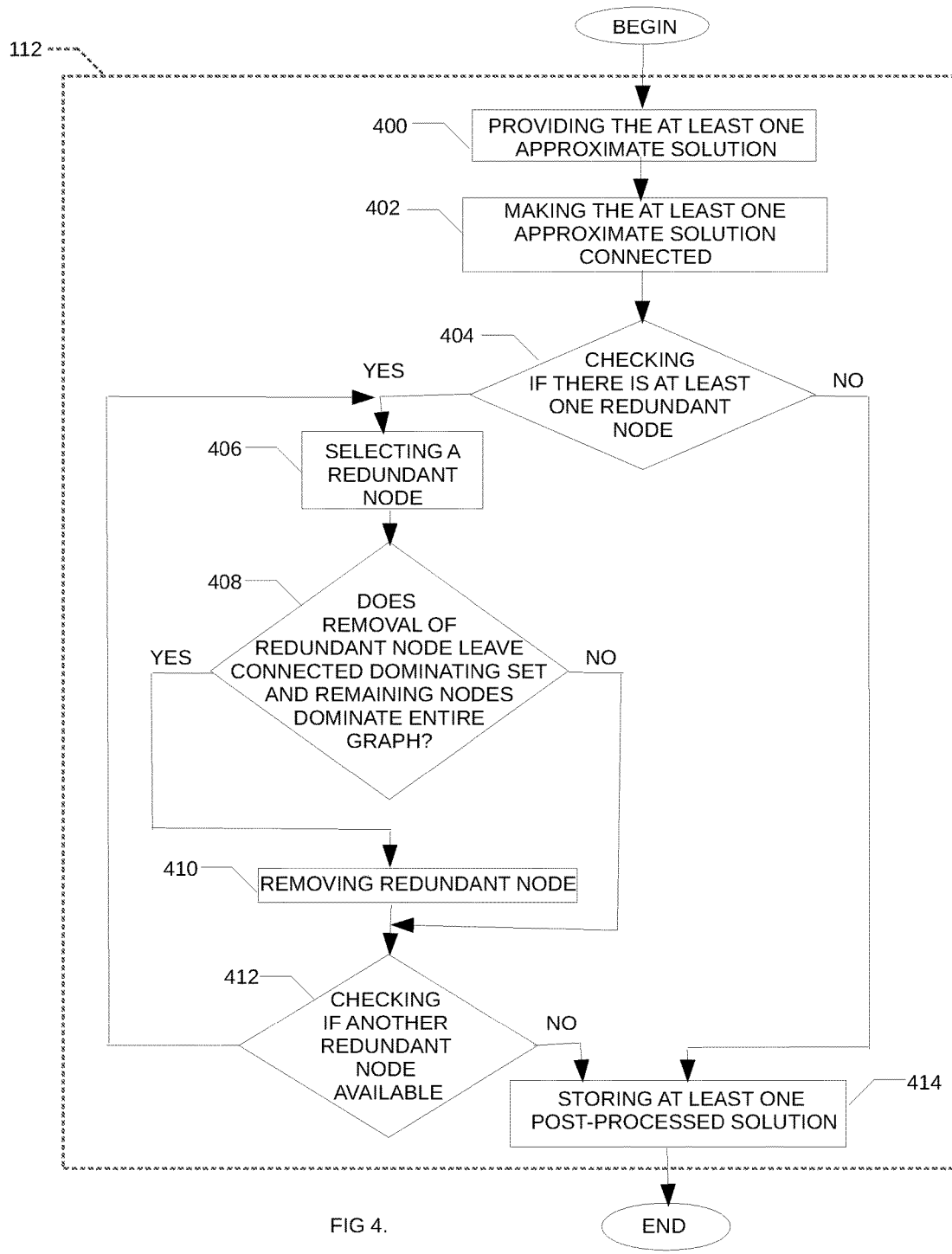
FIG. 4 is a flowchart which shows an embodiment for performing a post-processing of at least one approximate solution provided by the quantum annealing solver.

Now referring to FIG. 4, there is shown an embodiment for performing a post-processing of the at least one approximate solution to the minimum connected dominating set problem obtained.

According to processing step 400, at least one approximate solution is provided.

According to processing step 402, the at least one approximate solution is made to be connected. It will be appreciated that the purpose of processing step 402 is to provide a connected dominating set, since the at least one approximate solution may not necessarily be a connected subgraph.

In one embodiment, a connected dominating set is provided using a greedy algorithm. For example, first all of the connected components indicated by the approximate solution are found. Then the nodes of the graph which are not in any of the connected components are sorted decreasingly according to the number of nodes in the components which are adjacent to them. Then the first node in the sorted list is added to the approximate solution, and the connected components are updated. This procedure is repeated until the updated approximate solution induces a connected subgraph of the input graph.

It will be appreciated by the skilled addressee that another algorithm may be used to make the at least one approximate solution to the minimum connected dominating set problem. It will be appreciated by the skilled addressee that another algorithm may be used to make the at least one approximate solution to the minimum connected dominating set problem. For example, a Steiner tree-based approach may be used (Min, Manki, Du, Hongwei, Jia, Xiaohua, Huang, Christina Xiao, Huang, Scott C.-H., and Wu, Weili, Improving Construction for Connected Dominating Set with Steiner Tree in Wireless Sensor Networks, Journal of Global Optimization, vol. 35, no. 1, pp. 111-119, http://dx.doi.org/10.1007/s10898-005-8466-1).

Still referring to FIG. 4 and according to processing step 404, a test is performed in order find out if there is at least one redundant node in the at least one approximate solution.

In the case where there is at least one redundant node and according to processing step 406, a node of the at least one redundant node is selected.

According to processing step 408, a test is performed in order to find out if the removal of the selected redundant node leaves a connected dominating set and if the remaining nodes dominate the entire graph.

If this is the case and according to processing step 410, the selected redundant node is removed from the at least one approximate solution.

According to processing step 412, a test is performed in order to find out if there is at least one redundant node left.

In the case where there is at least one redundant node left and according to processing step 406, a redundant node is selected.

In the case where there is not at least one redundant node left and according to processing step 414, at least one post-processed solution is stored. It will be appreciated that the storing of the at least one post-processed solution is optional.

Figure 7E:
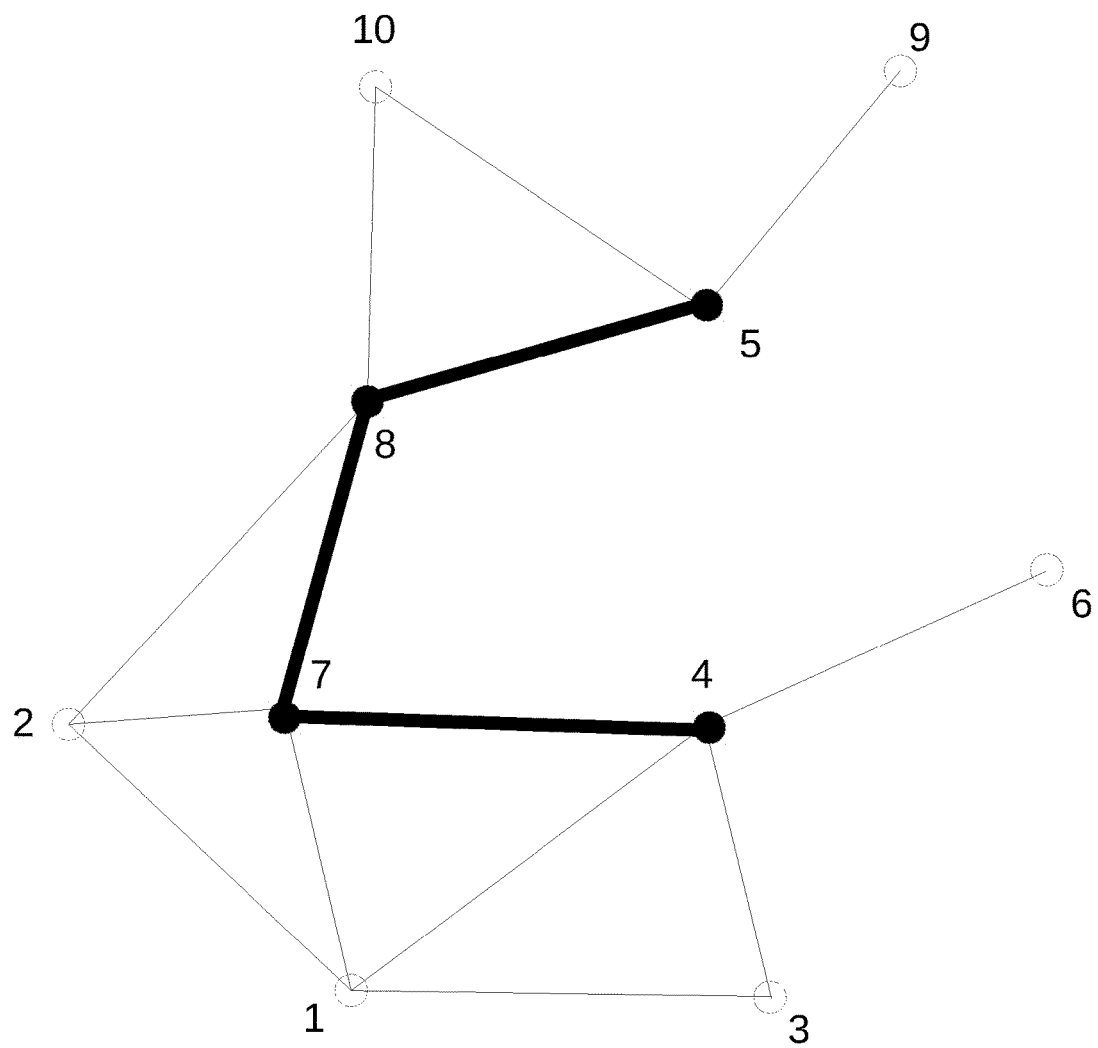

Now referring to FIG. 7e, there is shown an example of post-processing performed on the at least one approximate solution shown in FIG. 7d. Considering this example, one can check that although the approximate solution, that is, nodes 4, 5, and 7, are dominating the whole graph and are as close together as possible, they do not induce a connected subgraph. The post-processing step adds node 8 to the approximate solution. In the example, after performing the post-processing step, no redundant nodes are found, so the result consists of nodes 4, 5, 7, and 8, whose connection is shown with heavy black edges connecting these nodes in the graph.

The skilled addressee will appreciate that another algorithm may be used for post-processing the at least one approximate solution.

Now referring back to FIG. 1 and according to processing step 114, the at least one post-processed solution is provided.

Figure 6:
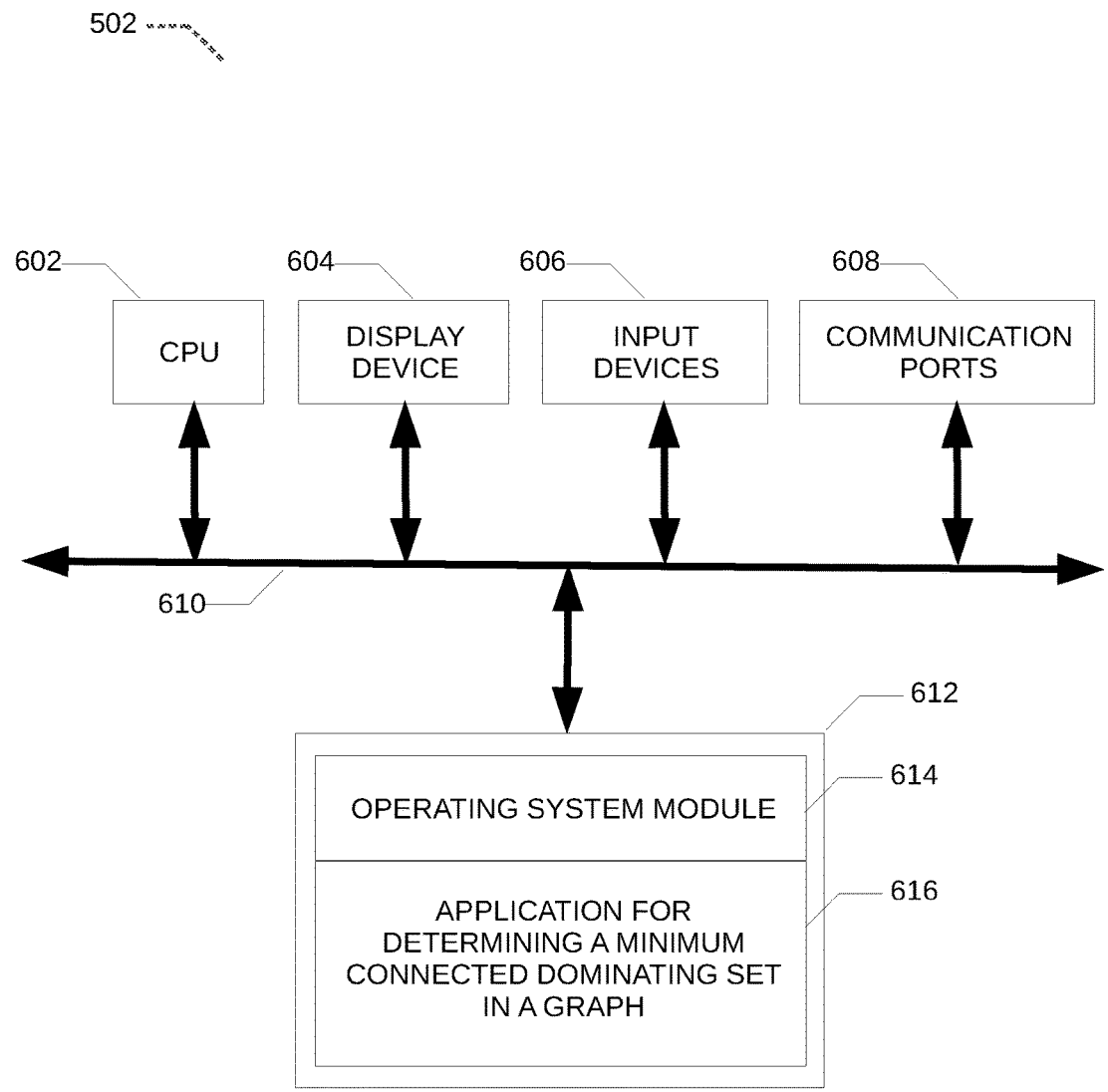
FIG. 6 is a block diagram which shows an embodiment of a digital computer used in a system for determining a minimum connected dominating set in a graph.

Now referring to FIG. 6, there is shown an embodiment of a digital computer 502. It will be appreciated that the digital computer 502 may also be broadly referred to as a processing unit.

In this embodiment, the digital computer 502 comprises a central processing unit (CPU) 602, also referred to as a microprocessor, a display device 604, input devices 606, communication ports 608, a data bus 610, and a memory unit 612.

The CPU 602 is used for processing computer instructions. The skilled addressee will appreciate that various embodiments of the CPU 602 may be provided.

In one embodiment, the CPU 602 is a CPU Core i7-3820 running at 3.6 GHz and manufactured by Intel™.

The display device 604 is used for displaying data to a user. The skilled addressee will appreciate that various types of display device 604 may be used.

In one embodiment, the display device 604 is a standard liquid-crystal display (LCD) monitor.

The communication ports 608 are used for sharing data with the digital computer 502.

The communication ports 608 may comprise for instance a universal serial bus (USB) port for connecting a keyboard and a mouse to the digital computer 502.

The communication ports 608 may further comprise a data network communication port such as an IEEE 802.3 (Ethernet) port for enabling a connection of the digital computer 502 with another computer via a data network. The skilled addressee will appreciate that various alternative embodiments of the communication ports 608 may be provided.

In one embodiment, the communication ports 608 comprise an Ethernet port and a mouse port (e.g., Logitech™).

The memory unit 612 is used for storing computer-executable instructions.

It will be appreciated that the memory unit 612 comprises, in one embodiment, an operating system module 614. It will be appreciated by the skilled addressee that the operating system module 614 may be of various types.

In an embodiment, the operating system module 614 is Windows™ manufactured by Microsoft™.

The memory unit 612 further comprises an application for determining a minimum connected dominating set in a graph 616.

The application for determining a minimum connected dominating set in a graph 616 comprises instructions for obtaining an indication of an input graph, the input graph comprising a plurality of nodes and a plurality of edges.

The application for determining a minimum connected dominating set in a graph 616 further comprises instructions for generating a distance table comprising for each node of the input graph, an indication of a distance between the given node and each of the other node of the plurality of nodes.

The application for determining a minimum connected dominating set in a graph 616 further comprises instructions for generating a corresponding constrained binary quadratic programming problem using the generated distance table.

The application for determining a minimum connected dominating set in a graph 616 further comprises instructions for providing the corresponding constrained binary quadratic programming problem to a quantum annealing solver.

The application for determining a minimum connected dominating set in a graph 616 further comprises instructions for obtaining at least one approximate solution from the quantum annealing solver.

The application for determining a minimum connected dominating set in a graph 616 further comprises instructions for post-processing the at least one approximate solution.

The application for determining a minimum connected dominating set in a graph 616 further comprises instructions for providing the post-processed at least one approximate solution.

Each of the CPU 602, the display device 604, the input devices 606, the communication ports 608, and the memory unit 612 is interconnected via the data bus 610.

It will be appreciated that a non-transitory computer-readable storage medium is further disclosed. The non-transitory computer-readable storage medium is used for storing computer-executable instructions which, when executed, cause a digital computer to perform a method for determining a minimum connected dominating set in a graph. The method comprises obtaining an indication of an input graph, the input graph comprising a plurality of nodes and a plurality of edges; generating a distance table comprising for each node of the input graph, an indication of a distance between the given node and each of the other node of the plurality of nodes; generating a corresponding constrained binary quadratic programming problem using the generated distance table; providing the corresponding constrained binary quadratic programming problem to a quantum annealing solver; obtaining at least one approximate solution from the quantum annealing solver; post-processing the at least one approximate solution and providing the post-processed at least one approximate solution.

It will be appreciated that an advantage of the method disclosed herein is that it enables the determining of a near-optimal solution to a minimum connected dominating set problem for many problem instances in less time compared to an exact classical algorithm.

It will be further appreciated that the method disclosed herein is capable of determining a near optimal solution to a minimum connected dominating set problem involving a large graph thanks to the use of the quantum annealing solver. Prior-art classical solvers are not capable of determining a near optimal solution to a minimum connected dominating set problem involving a large graph.

It will be appreciated that the method disclosed herein does not rely on an exact solution to the constrained binary quadratic programming problem. As a consequence, the inherently probabilistic (or "noisy") nature of solutions provided by current quantum annealers is not necessarily detrimental to the solving of the minimum connected dominating set problem involving the minimum connected dominating set algorithm.

Although the above description relates to a specific preferred embodiment as presently contemplated by the inventor, it will be understood that the invention in its broad aspect includes functional equivalents of the elements described herein.

The invention claimed is:

1. A method for determining a minimum connected dominating set in a graph, the method comprising:
   obtaining an indication of an input graph, the input graph comprising a plurality of nodes and a plurality of edges;
   generating a distance table comprising for each node of the input graph, an indication of a distance between the given node and each of the other node of the plurality of nodes;
   generating a corresponding constrained binary quadratic programming problem using the generated distance table;
   providing the corresponding constrained binary quadratic programming problem to a quantum annealing solver;
   obtaining at least one approximate solution from the quantum annealing solver;
   post-processing the at least one approximate solution; and
   providing the post-processed at least one approximate solution.

2. The method as claimed in claim 1, wherein the quantum annealing solver is an unconstrained quantum annealing solver; further wherein the providing of the corresponding constrained binary quadratic programming problem comprises:
   generating an unconstrained binary quadratic programming problem using the generated constrained binary quadratic programming problem; and
   providing the generated unconstrained binary quadratic programming problem to the unconstrained quantum annealing solver; and
   further wherein the at least one approximate solution is obtained from the unconstrained quantum annealing solver.

3. The method as claimed in claim 1, wherein the quantum annealing solver is a constrained quantum annealing solver; wherein the providing of the corresponding constrained binary quadratic programming problem comprises:
   obtaining a corresponding solver subroutine; and
   solving the generated constrained binary quadratic programming problem using the solver subroutine; further wherein the at least one approximate solution is obtained from the solver subroutine.

4. The method as claimed in claim 1, further comprising:
   obtaining an indication of a solver to use for determining a minimum connected dominating set;
   if the indication of a solver comprises an unconstrained quantum annealing solver, the obtaining of the at least one approximate solution from the quantum annealing solver comprising:
      generating an unconstrained binary quadratic programming problem using the generated constrained binary quadratic programming problem, providing the unconstrained binary quadratic programming problem to the unconstrained quantum annealing solver, obtaining at least one approximate solution from the unconstrained quantum annealing solver.

5. The method as claimed in claim 1, wherein the indication of an input graph is obtained from at least one of a user interacting with a digital computer, a computer operatively connected to the digital computer, a software package, and an intelligent agent.

6. The method as claimed in claim 1, wherein the post-processed at least one approximate solution is provided to at least one of a user interacting with a digital computer, a computer operatively connected to the digital computer, a software package, and an intelligent agent.

* * * * *